United States Patent Office 3,388,076
Patented June 11, 1968

3,388,076
PREPARATION OF TITANIUM CATALYST
Bayard T. Lamborn, Matawan, N.J., assignor to Hercules Incorporated, a corporation of Delaware
No Drawing. Filed July 23, 1965, Ser. No. 474,507
5 Claims. (Cl. 252—429)

This invention relates to a process for preparing improved trivalent titanium catalysts for use in the polymerization and copolymerization of ethylene and higher 1-olefins.

Polymers and copolymers of 1-olefins have achieved additional prominence in recent years since the discovery of the so-called transition metal catalysts, which make possible the production of such polymers having very desirable properties at relatively mild conditions of temperature and pressure.

The generic term "transition metal catalysts" is used in the polyolefin art to refer to a class of catalyst compositions comprising transition metal compounds in a reduced valence state in combination with an activator which is usually an alkylaluminum compound. The transition metal compounds most widely used are compounds of trivalent titanium. The preferred trivalent titanium compound is "titanium trichloride," a term which is used generically in the art as it is applied not only to pure titanium trichloride but also to compositions in which titanium trichloride is co-crystallized with an aluminum compound such as aluminum trichloride. For example, a material sold commercially and referred to as titanium trichloride and made by reduction of $TiCl_4$ with metallic aluminum is actually co-crystallized $3TiCl_3 \cdot AlCl_3$ having the empirical formula $AlTi_3Cl_{12}$. Other compounds referred to as titanium trichloride can be prepared by reducing $TiCl_4$ with hydrogen, metallic titanium, or titanium monoxide. Another method of making titanium trichloride comprises reducing $TiCl_4$ with an organo-aluminum compound such as a trialkylaluminum or an alkylaluminum halide. Here again, the product of such reduction is not pure $TiCl_3$, but titanium trichloride co-crystallized with other materials such as with $AlCl_3$ or with $AlCl_3$ and an organoaluminum halide. See, for instance, U.S. Patents 3,058,963 and 3,108,973 to E. J. Vandenberg and U.S. Patent 3,128,252 to Tornqvist et al. In all of these processes the titanium trichloride catalyst is obtained in the form of relatively coarse particles ranging upwards of 20 microns in mean diameter.

It is desirable in the case of some polymerization reactions for the titanium trichloride catalysts to be extremely finely divided. In U.S. Patent 2,968,652 to Mertes there is described a process for reducing the particle size of titanium trichloride particles from an average size of from about 25 microns to about 0.1 to 5 microns by subjecting the particles to ultrasonic vibrations in an inert liquid medium. The resultant finely divided particles are said to yield highly crystalline polymers at better rates and yields than coarser catalysts.

It is desirable in the case of some polymerizations for the titanium trichloride catalyst to be extremely finely divided. As a general rule, the more finely divided the catalyst, the more active it will be and the smaller will be the particle size of the polymer produced by its use. Polymers of small particle size are much sought after for use as flatting agents and texturizing pigments in coating compositions and for use as coatings, per se, via fused coating techniques.

It is accordingly an object of the present invention to produce, without grinding or other physical treatment, a titanium trichloride catalyst of exceptionally small particle size.

The present invention is directed to a process for preparing a titanium trichloride-containing catalyst which comprises reacting $TiCl_4$ with an organoaluminum compound in an inert organic liquid diluent in which both reactants are soluble in the presence of a rubbery hydrocarbon polymer containing active oxygen atoms, said polymer being dissolved in said diluent in the amount of about 0.01 to 1 part per part of $TiCl_4$ by weight. This process as described differs from the known art solely in the inclusion in the reaction mixture of the oxidized, rubbery hydrocarbon polymer, but somehow due to the presence of this polymer, the catalyst precipitates from the reaction mixture as much smaller particles than is the case when the polymer is not present.

Any organoaluminum compound can be used to reduce the $TiCl_4$ in the process of this invention, but especially suitable are aluminum trialkyls, dialkylaluminum halides, and alkylaluminum dihalides. Examples of such compounds are triethylaluminum, tripropylaluminum, diethylaluminum chloride, dipropylaluminum chloride, diisobutylaluminum chloride, ethylaluminum dichloride, isopropylaluminum dichloride, isobutylaluminum dichloride, and the like. Also useful are the mixtures of the alkylaluminum dichlorides and the dialkylaluminum chlorides. These mixtures are known as dialkylaluminum sesquichlorides. A particularly useful such mixture is ethylaluminum sesquichloride containing 25 to 75 mole percent diethylaluminum chloride and 75 to 25 mole percent ethylaluminum dichloride. Because these alkylaluminum chlorides are pyrophoric, it is advisable that they be used as solutions in inert diluent containing no less than 70 weight percent diluent.

The rubbery hydrocarbon polymer containing active oxygen atoms employed in the invention can be any of the known rubbery hydrocarbon polymers, either homopolymers or copolymers, which have been oxidized by exposure to oxygen. Typical rubbery hydrocarbon polymers which can be oxidized and used in the invention are polyisobutylene, ethylene-propylene copolymer, polyisoprene, polybutadiene, ethylene-propylene-dicyclopentadiene terpolymer, styrene-butadiene copolymer, and the like. Oxidation of such polymers is well known and can be effected by a variety of techniques ranging from a brief milling at an elevated temperature in an oxygen atmosphere to prolonged shelf storage in air. The amount of oxygen incorporated in the polymer can range from about 0.1 to 1.0% by weight of the polymer.

The reaction may be carried out in any inert liquid diluent in which the organoaluminum compound, $TiCl_4$, and oxidized polymer are mutually soluble. Such diluents include, e.g., saturated liquid aliphatic hydrocarbons such as hexane, heptane, and the like, cycloaliphatic hydrocarbons, halogenated hydrocarbons, either aliphatic or aromatic, or any mixture of such diluents.

The process of the invention can be carried out by subjecting a vessel containing a diluent solution of one of the reactants and the oxidized rubbery hydrocarbon polymer. The other reactant is then added to the vessel while agitating. Due to the presence of the rubbery hydrocarbon polymer, the titanium trichloride-containing precipitate that forms is prevented from forming into large particle size.

The theory of the invention is obscure, but one possible explanation is that the oxidized polymer attaches itself to individual crystallites and forms a swollen "bumper" which prevents agglomeration of crystals. The invention is not to be construed, however, as limited to this mechanism because one or more other mechanisms might account for the success of the invention.

The process produces spheroidal catalyst particles of nearly uniform size which have a mean maximum dimension within the range of about ½ to 3 microns. The size of the particles from a given preparation depends upon the conditions under which the reaction is carried out, such as the concentration of oxidized polymer, temperature, and other variables. A particularly advantageous result of using the fine catalyst particles prepared by the method of this invention in the slurry polymerization of 1-olefins is that the resultant polymer particles are of substantially smaller size than obtained by the use of conventional catalysts.

The titanium trichloride-containing catalyst particles of the invention are used in known manner as catalysts for the polymerization and copolymerization of olefins. They can be used, for example, without isolation from the inert diluent in which they are prepared, in which case it is necessary to add a further quantity of an organoaluminum compound such as triethylaluminum to activate the catalyst. However, in the usual and preferred instance, the catalyst particles are separated from the diluent in which they are prepared by mechanical means such as filtration, centrifugation, or the like, and then washed one or more times with an inert solvent so as to remove the soluble by-products that were formed in the reduction. The titanium trichloride-containing catalyst particles are then used in combination with an organoaluminum compound as an activator. Generally, the polymerization will be carried out in an inert diluent either as a batch or continuous operation. Suitable diluents are such as those listed above for carrying out the preparation of the catalyst particles. The selection of temperature and pressure used for the polymerization process will obviously depend upon the monomer, the activity of the catalyst system being used, the degree of polymerization desired, etc. In general, the polymerization will be carried out at room temperature or slightly above, but any temperature within the range of from about —50° C. to about 150° C., and preferably from about —20° C. to about 100° C., may be used. In the same way, while atmospheric pressure or a pressure of only a few pounds may be used, the polymerization may be carried out over a wide range of pressures, as, for example, from a partial vacuum to about 1000 lbs., and preferably from about atmospheric to about 500 lbs. pressure. Higher pressures may, of course, be used, but generally do not appreciably alter the course of the polymerization. The manner in which the two catalyst components are added to the polymerization system will depend upon the method by which the polymerization is carried out. They may be added all at once, in any order, or one or the other or both may be added in increments or continuously during the polymerization.

The organoaluminum compound that is used in combination with the titanium trichloride catalyst of this invention, for highest rates, yields and stereoregularity, will be an alkylaluminum compound, the specific nature of which will depend upon the monomer being polymerized. Thus, in the case of propylene and other linear 1-olefins, the best results are obtained when a dialkylaluminum chloride is used as the activator. In the case of styrene and other α-olefins which are more readily polymerized by means of an acid catalyst, which type of polymerization is desirably avoided in the production of a highly stereoregular polymer, the alkylaluminum compound used as the activator is preferably a trialkylaluminum. The alkylaluminum compounds that are used may be any alkylaluminum compound, as, for example, triethylaluminum, tripropylaluminum, triisobutylaluminum, trihexylaluminum, trioctylaluminum, tridodecylaluminum, dimethylaluminum chloride, diethylaluminum chloride, dipropylaluminum chloride, diisobutylaluminum chloride, diethylaluminum hydride, diisobutylaluminum hydride, etc.

The following examples illustrate the invention. Parts and percentages are by weight unless otherwise specified.

EXAMPLE 1

Into a reaction vessel equipped with a stirrer and filled with nitrogen there was introduced 715 millimoles of ethylaluminum sesquichloride (a mixture of 47 mole percent diethylaluminum chloride and 53 mole percent ethylaluminum dichloride) in the form of a 25% solution in a paraffinic hydrocarbon diluent having a boiling range of 170 to 200° C. Contents of the reaction vessel were cooled to 0° C. while stirring and 1 gram of oxidized ethylene-propylene rubber dissolved in 9 grams of the diluent were added. The ethylene-propylene rubber was an amorphous copolymer of ethylene and propylene containing about 50 mole percent ethylene and having a reduced specific viscosity of 0.5 and containing 0.25% combined oxygen which had been introduced into the copolymer by prolonged storage in air. Next there was added to the contents of the vessel 600 millimoles of $TiCl_4$ dropwise over a period of 4 hours while continuing stirring and maintaining the temperature at 0° C. The temperature was maintained an additional 4 hours at 0° C. following the $TiCl_4$ addition and was then allowed to rise to room temperature gradually. The reaction mixture was then heated for 4 hours at 95° C. The titanium trichloride catalyst which it formed as a precipitate was washed with fresh reaction diluent and reslurried in additional diluent. The catalyst was in the form of fine particles averaging about 1 micron in size.

The catalyst was used to polymerize propylene as follows. A polymerization vessel was charged with 500 milliliters of the same diluent as employed in the catalyst preparation to which was added 20 millimoles/liter of diethylaluminum chloride and 10 millimoles/liter of catalyst. After heating the contents of the reactor to 50° C., propylene was fed at 30 p.s.i.a. for 5 hours. The reaction was terminated by the addition of 10 milliliters of n-butanol and the crystalline polypropylene which had formed as a precipitate was recovered by decanting the diluent, washing the diluent-wet polymer with water, steam distilling to remove the remainder of diluent, and then drying the polymer. Results of the screening analysis of the polymer were as follows:

|  | Percent of polymer |
|---|---|
| On 100 mesh | 0.2 |
| On 140 mesh | 0.4 |
| On 200 mesh | 1.4 |
| On 230 mesh | 0.4 |
| Pan | 97.5 |

The same catalyst preparation carried out without the addition of ethylene-propylene rubber resulted in a catalyst having an average particle size of about 20 microns which, when used to polymerize propylene, resulted in a polymer showing the following screening analysis:

|  | Percent of polymer |
|---|---|
| On 100 mesh | 0.1 |
| On 140 mesh | 5.3 |
| On 200 mesh | 74.0 |
| On 230 mesh | 3.5 |
| Pan | 17.1 |

EXAMPLE 2

The procedure of Example 1 was followed with the single exception that the preparation of the catalyst there was used, in place of the oxidized ethylene-propylene rubber, a rubbery terpolymer of ethylene, propylene, and dicyclopentadiene which had been oxidized by milling in the presence of air at a temperature of 200° C. for 1 hour. The polymer contained 41 weight percent ethylene and 47.5 weight percent propylene and 11.5 weight percent dicyclopentadiene and contained about 0.2% oxygen. The catalyst that was produced had an average particle size of about 1 micron. When used to polymerize propylene, the polymer produced showed the following screening analysis:

| | Percent of polymer |
|---|---|
| On 100 mesh | [1] 1.8 |
| On 140 mesh | 0.4 |
| On 200 mesh | 3.3 |
| On 230 mesh | 2.2 |
| Pan | 93.0 |

[1] Mostly agglomerated fines.

The fine particle catalysts produced by the process of this invention are useful in the preparation of polymers of other 1-olefins, e.g., ethylene, in addition to propylene as well as copolymers of such olefins.

The most pronounced advantage is gained from using the fine catalyst particles of this invention, however, with crystalline polymers and copolymers which are insoluble in the reaction diluent. The amorphous olefin polymers are usually soluble in the reaction diluent and thus the fine catalyst particles cannot contribute to the formation of fine particles of these polymers. Typical crystalline polymers which can be formed in addition to polyethylene and polypropylene are poly(butene-1), poly(4-methylpentene-1), polystyrene, and crystalline copolymers of such olefins with each other.

It is also known to modify the polymerization process by the addition of molecular weight and viscosity controllers such as oxygen and hydrogen. The improved catalysts of this invention are also useful in these modified processes. In short, the catalysts of this invention are useful in any process for polymerizing 1-olefins where titanium trichloride catalysts have been found useful in the past.

What I claim and desire to protect by Letters Patent is:

1. A process for preparing a titanium trichloride catalyst for use in the polymerization of olefins which comprises reacting $TiCl_4$ with an organoaluminum compound in an inert organic liquid diluent in which both reactants are soluble in the presence of an oxidized rubbery hydrocarbon polymer, said polymer being dissolved in said diluent in the amount of about 0.01 to 1 part per part of $TiCl_4$ by weight.

2. The process of claim 1 in which the oxidized rubbery hydrocarbon polymer is oxidized ethylene-propylene copolymer.

3. The process of claim 1 in which the oxidized rubbery hydrocarbon polymer is oxidized polyisoprene.

4. The process of claim 1 in which the oxidized rubbery hydrocarbon polymer is oxidized ethylene-propylene-diene terpolymer.

5. The process of claim 1 in which the oxidized rubbery hydrocarbon polymer contains from about 0.1 to 1.0% by weight of oxygen.

References Cited

UNITED STATES PATENTS

| | | | |
|---|---|---|---|
| 1,901,045 | 3/1933 | Schmidt | 260—94.7 |
| 2,610,110 | 9/1952 | Eliasson | 23—300 |
| 2,660,563 | 11/1953 | Banes et al. | 260—94.7 XR |
| 3,030,350 | 4/1962 | De Jong et al. | 252—429 XR |
| 3,042,661 | 7/1962 | Kirshenbaum et al. | 260—94.7 XR |
| 3,065,220 | 11/1962 | McManimie et al. | 252—429 XR |

FOREIGN PATENTS 834,217  5/1960  Great Britain.

DANIEL E. WYMAN, *Primary Examiner.*

PATRICK P. GARVIN, *Examiner.*